United States Patent
Karol et al.

(10) Patent No.: US 6,628,617 B1
(45) Date of Patent: Sep. 30, 2003

(54) TECHNIQUE FOR INTERNETWORKING TRAFFIC ON CONNECTIONLESS AND CONNECTION-ORIENTED NETWORKS

(75) Inventors: Mark John Karol, Fair Haven, NJ (US); Malathi Veeraraghavan, Atlantic Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/261,807

(22) Filed: Mar. 3, 1999

(51) Int. Cl.[7] .................... H04L 12/56; H04L 12/64; H04L 12/66
(52) U.S. Cl. .............. 370/237; 370/466; 370/477; 370/401; 370/412; 370/352; 370/353; 370/354; 370/355; 370/356; 370/236; 370/230.1; 370/389; 370/395.1; 370/395.5; 370/395.65
(58) Field of Search ................ 370/229, 230.1, 370/235, 236, 237, 238, 352–353, 354, 355, 356, 357, 359, 389, 392, 395.1, 395.5, 395.51, 395.52, 395.65, 395.7, 395.72, 400, 401, 410, 412, 419, 428, 429, 465, 466, 468, 477

(56) References Cited

U.S. PATENT DOCUMENTS

| | | | | |
|---|---|---|---|---|
| 6,016,319 A | * | 1/2000 | Kshirsagar et al. | 370/399 |
| 6,055,561 A | * | 4/2000 | Feldman et al. | 370/220 |
| 6,091,725 A | * | 7/2000 | Cheriton et al. | 370/392 |
| 6,147,989 A | * | 11/2000 | Esaki et al. | 370/355 |
| 6,151,319 A | * | 11/2000 | Dommety et al. | 370/395.52 |
| 6,160,793 A | * | 12/2000 | Ghani et al. | 370/236 |
| 6,201,792 B1 | * | 3/2001 | Lahat | 370/236 |
| 6,252,853 B1 | * | 6/2001 | Ohno | 370/242 |
| 6,259,699 B1 | * | 7/2001 | Opalka et al. | 370/389 |
| 6,317,431 B1 | * | 11/2001 | Hodgkinson et al. | 370/392 |
| 6,320,874 B1 | * | 11/2001 | Crump et al. | 370/401 |
| 6,339,594 B1 | * | 1/2002 | Civanlar et al. | 370/352 |
| 6,343,083 B1 | * | 1/2002 | Mendelson et al. | 370/392 |
| 6,343,322 B2 | * | 1/2002 | Nagami et al. | 370/395.3 |
| 6,343,326 B2 | * | 1/2002 | Acharya et al. | 709/238 |
| 6,381,244 B1 | * | 4/2002 | Nishimura et al. | 370/395.21 |
| 6,490,252 B1 | * | 12/2002 | Riggan et al. | 370/237 |

* cited by examiner

*Primary Examiner*—Hassan Kizou
*Assistant Examiner*—Ahmed Elallam
(74) *Attorney, Agent, or Firm*—Matthew J. Hodulik; Barry H. Freedman

(57) ABSTRACT

Traffic on a connectionless (CL) network, such as IP packets, can be routed onto a connection a connection oriented (CO) network, such as an ATM telephony network, when it is advantageous to do so from a user or service provider viewpoint, without affecting the ability of users to continue to use existing applications. Routing is controlled by nodes called CL-CO gateways, with connectivity to both the CL network and the Co network. When CL traffic originating at a source reached these gateway nodes, a decision is made whether to continue carrying the information in the CL mode, or to redirect the traffic to a CO network. In accordance with one embodiment of the present invention, each CL-Co gateway includes hardware and software modules that typically comprise (a) interfaces to the Co network, (b) interfaces to the CL network (c) a moderately sized packet buffer for temporarily storing packets waiting for CO network setup or turnaround; (d) a database for storing forwarding, flow control header translation and other information, and (e) a processor containing logic for controlling the gateway packet handling operations.

19 Claims, 9 Drawing Sheets

TECHNIQUE FOR INTERNETWORKING TRAFFIC ON CONNECTIONLESS AND CONNECTION-ORIENTED NETWORKS

FIELD OF THE INVENTION

The present invention relates generally to the internetworking of connectionless (e.g. Internet Protocol or "IP") and connection oriented (e.g. ATM, MPLS, RSVP) networks, and, more particularly, to a technique that allows datagrams (messages) generated by source endpoints on a connectionless (CL) network to be redirected to destinations on a CL network via a communication path that includes a connection oriented (CO) network operated in a switched mode (as opposed to a provisioned mode) if there is an advantage from the user or service provider prospective.

BACKGROUND OF THE INVENTION

Connectionless (CL) networks and connection-oriented (CO) networks have some fundamental distinguishing features. In CL networks, no explicit connection setup actions are executed prior to transmitting datagrams; instead, datagrams are routed through a series of interconnected nodes to their destinations based on information in their headers. CO networks operated in the switched mode (as opposed to the provisioned mode) are those in which connection setup for each call or session is performed prior to information transfer. (In a provisioned mode, the path through the network from a source to a destination is set up in advance, i.e., when the network is provisioned, and is not changed on a short term, i.e., call by call basis). In CO networks, connection setup actions consist of determining a route for the connection, allocating bandwidth (and possibly buffer) resources on the links and switches on the route, assigning and distributing "labels" or "positions" (e.g., time slots or wavelengths) based on whether the CO network is packet or circuit switched, respectively, and programming connection information into switch fabrics and endpoints.

These two types of networks, CO and CL, enjoy advantages and disadvantages from both the user perspective and the service provider perspective. CL networks, for instance, do not suffer the delay and processing overhead associated with connection setup. In contrast, information about the connections in CO networks helps in providing service guarantees and, furthermore, makes it possible to most efficiently use network resources (e.g., bandwidth) by "switching" datagrams to appropriate connections as the connections are established.

The need to integrate and exploit the advantages of both CL and CO networks has long been recognized. Two examples are the use of SS7 (Signaling System No. 7) CL networks in conjunction with the CO telephony network, and the use of RSVP (Resource reSerVation Protocol) in IP networks. (See R. Braden, L. Zhang, S. Berson, S. Herzog, S. Jamin, "Resource ReSerVation Protocol (RSVP) Version 1 Functional Specification," IETF RFC 2205, September 1997) In both of these solutions, applications explicitly choose the networking mode appropriate to their needs.

Notwithstanding the need to integrate CL and CO networks, prior art approaches have heretofore not routed traffic from a source on a CL network onto a CO network operated in the switched mode (as opposed to a provisioned mode), because of the potential loss of datagrams during the time period when a path is being set up in the CO network. Specifically, if a transition between a CL network and a CO network occurs at a gateway, datagrams originating on the CL network and destined for a user continue to arrive at the gateway. These packets typically arrive every few microseconds, or less. During the time period when the path through the CO network toward the user is being set up, typically on the order of milliseconds, many datagrams will arrive at the gateway, and it is important that these datagrams not be lost. One possible solution, involving buffering of datagrams, has been suggested. However, this solution is generally impractical, since the size of the buffer would have to be very large.

SUMMARY OF THE INVENTION

In accordance with the present invention, nodes called CL-CO gateways, are arranged to have connectivity to both the CL network and the CO network. When CL traffic originating at a source reaches these gateway nodes, a decision is made whether to continue carrying the information in the CL mode, or to redirect the traffic to a CO network. In accordance with one embodiment of the present invention, each CL-CO gateway includes hardware and software modules that typically comprise (a) interfaces to the CO network, (b) interfaces to the CL network (c) a moderately sized packet buffer for temporarily storing packets waiting for CO network setup or turnaround; (d) a database for storing forwarding, flow control, header translation and other information, and (e) a processor containing logic for controlling the gateway packet handling operations. In accordance with another embodiment of the present invention, the gateway additionally includes a switch fabric for CO networking, a CL packet forwarding engine, and/or a protocol converter. Additionally, it is to be noted that the gateway of the present invention can be incorporated within a CL node, but not all nodes of the CL network need to have the ability to make redirect decisions.

In order to avoid the need for a large packet buffer and to also avoid the loss of datagrams, the gateway is arranged, in one embodiment of the present invention, to generate and transmit to the source of the datagrams, a signal requesting the source to slow down or stop transmission of datagrams during the time period when the gateway is establishing a path through the CO network. In another embodiment of the invention, datagrams received at the gateway are turned around and continue to be routed at least temporarily through the CL network during the period when the CO network path is being set up. As a further alternative, application or transport layer signals generated in the source are intercepted by the gateway and used to trigger connection setup in the CO network even before datagrams have been transmitted from the source, thereby assuring that when datagrams reach the gateway, there is no loss of information.

In the present invention, the CO network can be an MPLS (MultiProtocol Label Switching) or RSVP (Resource reSerVation Protocol) based IP network, a WDM (Wavelength Division Multiplexed) network, an ATM (Asynchronous Transfer Mode) network, or an STM (Synchronous Time Multiplexing) network, such as the telephony network or a SONET network. The CL network is typically, although not necessarily, an IP network. The present invention is useful, for example, in serving the needs of Internet users who want stricter quality-of-service guarantees for their file transfer application than is currently offered by the Internet.

DETAILED DESCRIPTION

Figure 1:
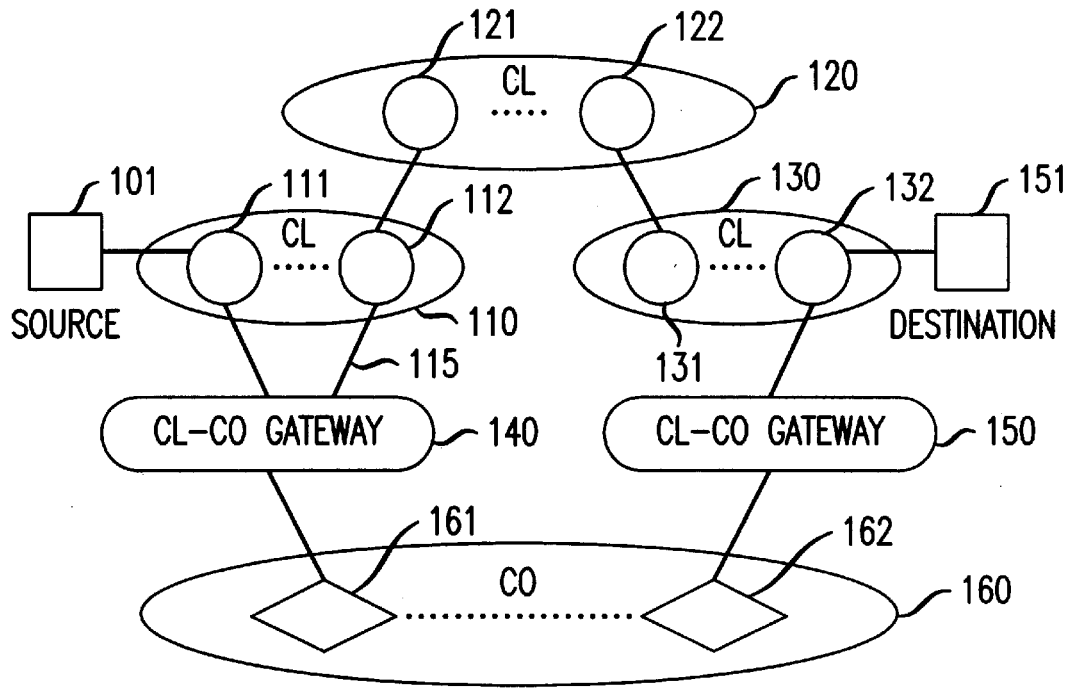
FIGS. 1 and 2 are diagrams illustrating two modes (parallel and serial, respectively) of internetworking CO and CL networks.
Figure 2:
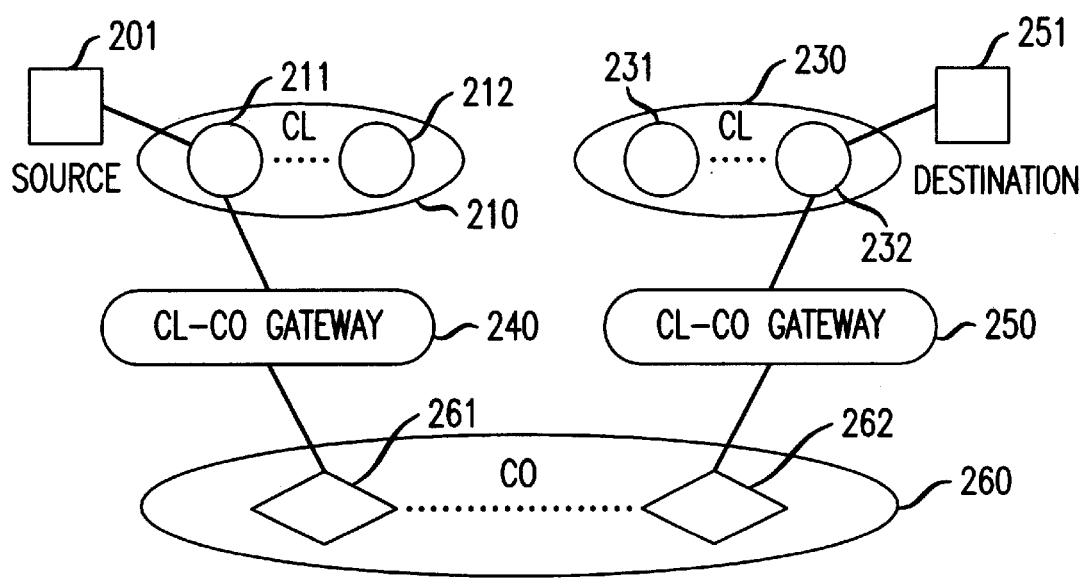

The CL-CO gateway arrangement envisioned by the present invention interconnects a CL network and a CO network, and allows existing CL applications running on CL endpoints to continue operating in the CL mode, while, at the same time, allowing datagrams (sometimes hereinafter called messages) originated on the CL network to be transported, for at least a portion of the path between source and destination, on the CO network operated in the switched mode. This is accomplished without loss of information, allowing the network as a whole to exploit the advantages of both networking modes (CO and CL). The CL-CO gateways of the present invention may be arranged to operate using several different strategies, depending upon the architecture of the individual CO and CL networks that are interconnected by the gateways. In particular, two architectures for internetworking CO and CL networks, called "parallel" and "serial", are illustrated in FIGS. 1 and 2, respectively. The parallel configuration could occur, for example, if two service providers, one with an IP-router-based network and the other with a CO-switch-based network, offer enterprises "long-distance" connectivity of their geographically distributed networks. The serial interconnecting configuration occurs, for instance, when an enterprise decides to route all their traffic through a specific service provider who happens to use a CO network. Of course, more general internetworking configurations are also possible (e.g., combinations of FIGS. 1 and 2), and networks can be envisioned with greater numbers of CL-CO and CO-CL transitions.

The CL-CO gateway of the present invention can operate in distinctly different modes, based upon which of the two basic internetworking configurations, parallel and serial, exists. In the parallel configuration, since at least two paths exist between the originating and destination CL nodes, one using the CL network and the other using the CO network, there is always a routing choice, i.e., CL to CO to CL or entirely CL. The gateway can make the routing selection based on maximizing efficiency. In the serial configuration, the path between the originating and destination CL nodes must necessarily include the CO network. Accordingly, the gateway must use the CO network to complete the transmission. A gateway arranged in accordance with the present invention can be programmed to automatically sense or detect the type of network environment that exists, and operate in the appropriate mode. Alternatively, the gateway can be appropriately programmed, on installation, to operate in a single mode suited to the network environment. Finally, it should be mentioned that a single purpose gateway dedicated to operate only in one or the other of the modes is also within the scope of this invention.

In the parallel architecture of FIG. 1, the present invention solves the problem of how to handle traffic (user-plane data) arriving at the CL-CO gateways until the desired connection is established in the CO network, given the "long" call setup delays associated with CO networks, by either (a) "turning around" a few packets, and continuing to route such packets through the CL network using, for example, source routing until the connection is set up, or (b) generating and transmitting to the source of the datagrams, a signal requesting the source to slow down or stop transmission of datagrams during the time period when the gateway is establishing a path through the CO network. As a further alternative, application or transport layer signals generated in the source are intercepted by the gateway and used to trigger connection setup in the CO network even before datagrams have been transmitted from the source, thereby assuring that when datagrams reach the gateway, there is no loss of information.

In the serial architecture of FIG. 2, there is no path available through the CL on which to "turn around" arriving packets. Accordingly, only the options of (a) halting incoming datagrams, or (b) intercepting the application or transport layer signals (sometimes referred to as "set-up messages"), can be used.

In FIG. 1, a source endpoint 101, which is a source of datagrams (such as a personal computer, workstation, or other processor attached to any information source) is directly connected to and served by a node 111 in a CL network 110. Traffic from source endpoint 101 destined for destination endpoint 151 (which is directly connected to and served by a node 132 in a CL network 130) can be routed in at least two different, parallel routes, and this choice of routes is reflected in how the CL-CO gateway 140 operates. In the first route, the datagram can follow a path that traverses only connectionless nodes, namely from node 111 possibly through other nodes (not shown) in CL network 110, but eventually though node 112, which routes traffic to a second CL network 120.

The datagram continues through various nodes in CL network 120, such as nodes 121, 122 and other nodes, not shown, and is routed finally to a third CL network 130 that includes node 132 serving destination endpoint 151. The path through the latter network is from node 131 through other nodes, not shown, to node 132. The second path that a datagram in FIG. 1 can follow extends at least partially over a CO network 160, using the CL-CO gateways 140 and 150 of the present invention, which are described in more detail below. Here, the path from source endpoint 101 is through node 111 in CL network 110 to the first gateway 140, where the datagrams are processed. When a path has been set up in a CO network 160, illustratively from node 161 through other nodes, not shown, to node 162, the datagrams entering CO network 160 from gateway 140 are routed to a second CL-CO gateway 150. There, the datagrams are again processed, and applied to node 132 in CL network 130, which node serves destination endpoint 151.

Before proceeding to a description of FIG. 2, it is to be noted that in both FIGS. 1 and 2, the source (101, 201) and the destination (151, 251) may not connect directly to the same CL node (e.g., node 111) that the CL-CO gateway (e.g. gateway 140) connects to. Also, the source or destination may be directly connected to a CL-CO gateway (e.g., gateway 140) as opposed to being connected through a CL node.

Referring now to FIG. 2, it is to be noted that a datagram originating in source 201 has only a single path to destination 251. The datagram must travel from CL network 210 to gateway 240, thence through CO network 260 to gateway 250, and thence through node 232 in CL network 230 to destination 251. Here, CL-CO gateway 240 has no choice in this sense: if a datagram arrives from source 201 and is destined for destination 251, that datagram must be routed onto CO network 260; there is no alternate route that can be taken. The arrangement of a CL-CO gateway in the environment of a serial architecture of FIG. 2 will be discussed further below. First, the arrangement of a CL-CO gateway in the environment of the parallel architecture of FIG. 1 will be described.

When a datagram arrives at a CL-CO gateway 140 of FIG. 1, a determination is made if that packet should be carried by CO network 160. Connections are set up through CO network 160 for some, but not necessarily all, of the arriving CL traffic. If a CO connection is set up, the path is similar to that described above. However, if a CO connection is not used, the path might extend from gateway 140 back to node 112 in CL network 110 via path 1 15, and thence through CL networks 120 and 130 to destination endpoint 151. Thus, CL-CO gateway 140 handles traffic both from flows for which CO connections are set up, as well as continues forwarding packets through the CL network if a CO connection is not set up. The decision to set up CO connections is made at CL-CO gateway 140, based on the user-specified service requirements and the traffic situation in the CL and CO networks.

Other differences exist between the way the present invention operates in the different architectures of FIGS. 1 and 2, and these differences should be mentioned briefly. First, the issue of how to set up routing tables at the routers in the CL network to take advantage of "shorter paths" that may exist through the CO network (or to meet users' subscribed-to service requirements) arises only for the "parallel" configuration (FIG. 1), since communication paths between the CL-CO gateways 140 and 150 exist in both the CL networks 110, 120 and 130 and the CO network 160. On the other hand, in FIG. 2, there is no choice but to direct the traffic to CO network 260, which implies that the routing issue is answered more readily. Second, in FIG. 1, it is also important to note that while a connection is being set up in CO network 160, communication can still take place through the CL networks 110, 120 and 130. Furthermore, even after the connection is established in CO network 160, data can be allowed to flow simultaneously through the CL and CO networks if both networks meet the user's needs.

Figure 3:
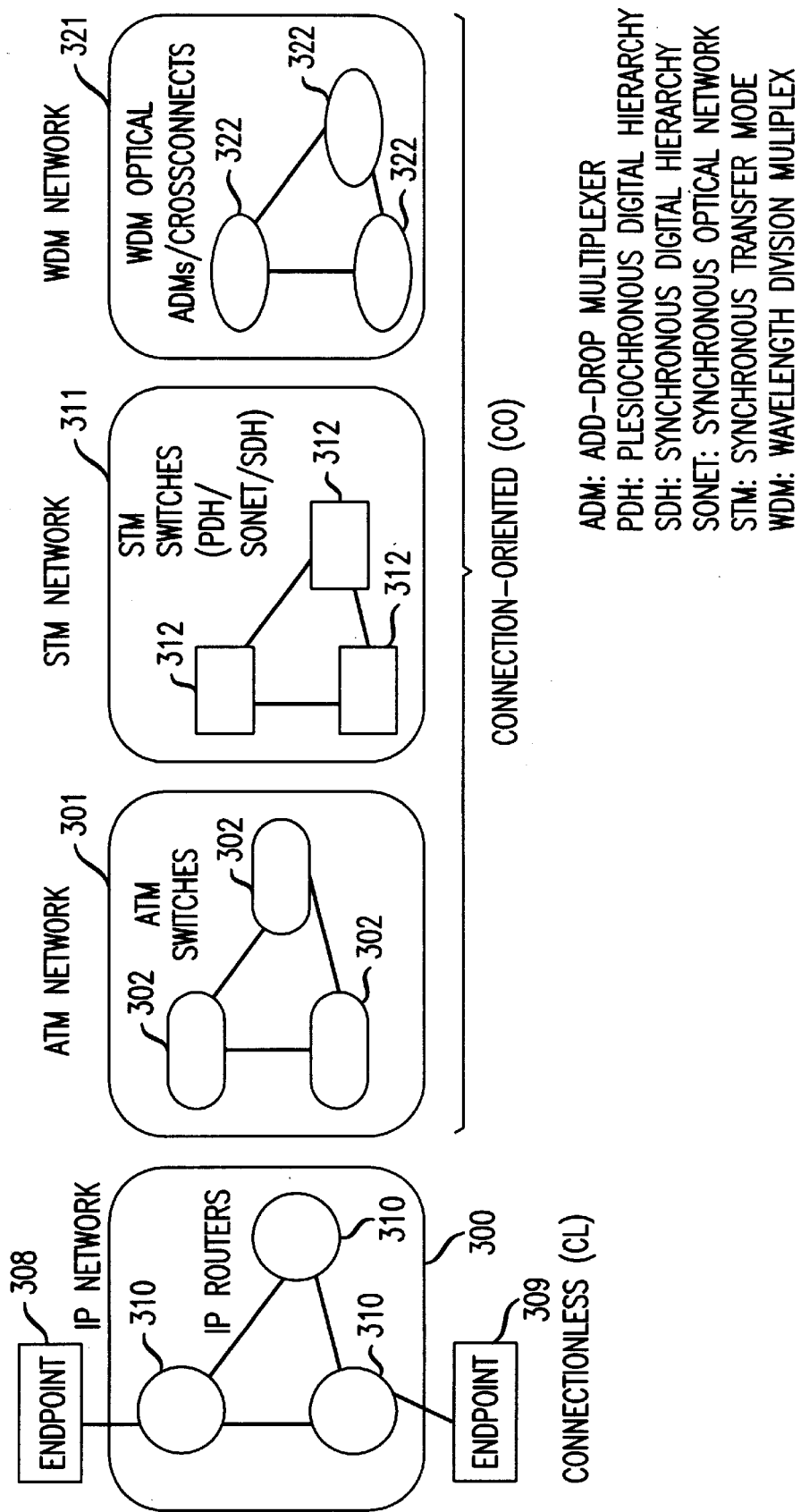
FIG. 3 is a diagram illustrating different types of CO and CL networks with which the present invention may be used.

It will now be instructive to consider examples of one CL network (the IP network) and three CO networks that can interoperate in accordance with the present invention. Referring to FIG. 3, network 300 is an IP (Internet Protocol) network comprised of a series of interconnected IP routers 310. Network 300 is connectionless (CL), because, as stated previously, traffic between endpoints 308 and 309 traverses the network without advance set up of a path or route through the network. All of the other networks (301, 311 and 321) shown in FIG. 3 are connection oriented (CO). In these networks, a path must be set up before traffic can traverse the network from endpoint to endpoint. Network 301 is an ATM (Asynchronous Time Multiplexed) network comprised of a series of interconnected ATM switches 302. Network 311 is an STM (Synchronous Time Multiplexed) network and is comprised of STM switches 312 that implement PDH/SONET/SDH hierarchies. Network 321 is a WDM (Wavelength Division Multiplexed) network, and is comprised of WDM optical switches, ADMs and crossconnects 322. All three CO networks 301, 311 and 321 can be operated in the switched mode.

As indicated above, the CO networks 301, 311 and 321 with which the present invention can be used, are assumed to be operated in the switched mode, rather than the provisioned mode. In the switched mode, the setup actions include determining a route for the connection, allocating bandwidth (and possibly buffer) resources on the links and switches on the route, assigning and distributing "labels" or "positions" (e.g., time slots or wavelengths) based on whether the CO network is packet or circuit switched, respectively, and programming connection information into switch fabrics and endpoints. If one or more of these actions occurs in response to a request to set up a connection for a specific data exchange, then the CO network is said to be operated in "switched mode." Otherwise, the CO network is said to be operated in "provisioned mode." For example, when SONET is used to create point-to-point links between IP routers, then it is operating in a provisioned mode; the SONET connections are not set up for specific data transfers, but rather to just transport IP packets between routers.

Figure 4:
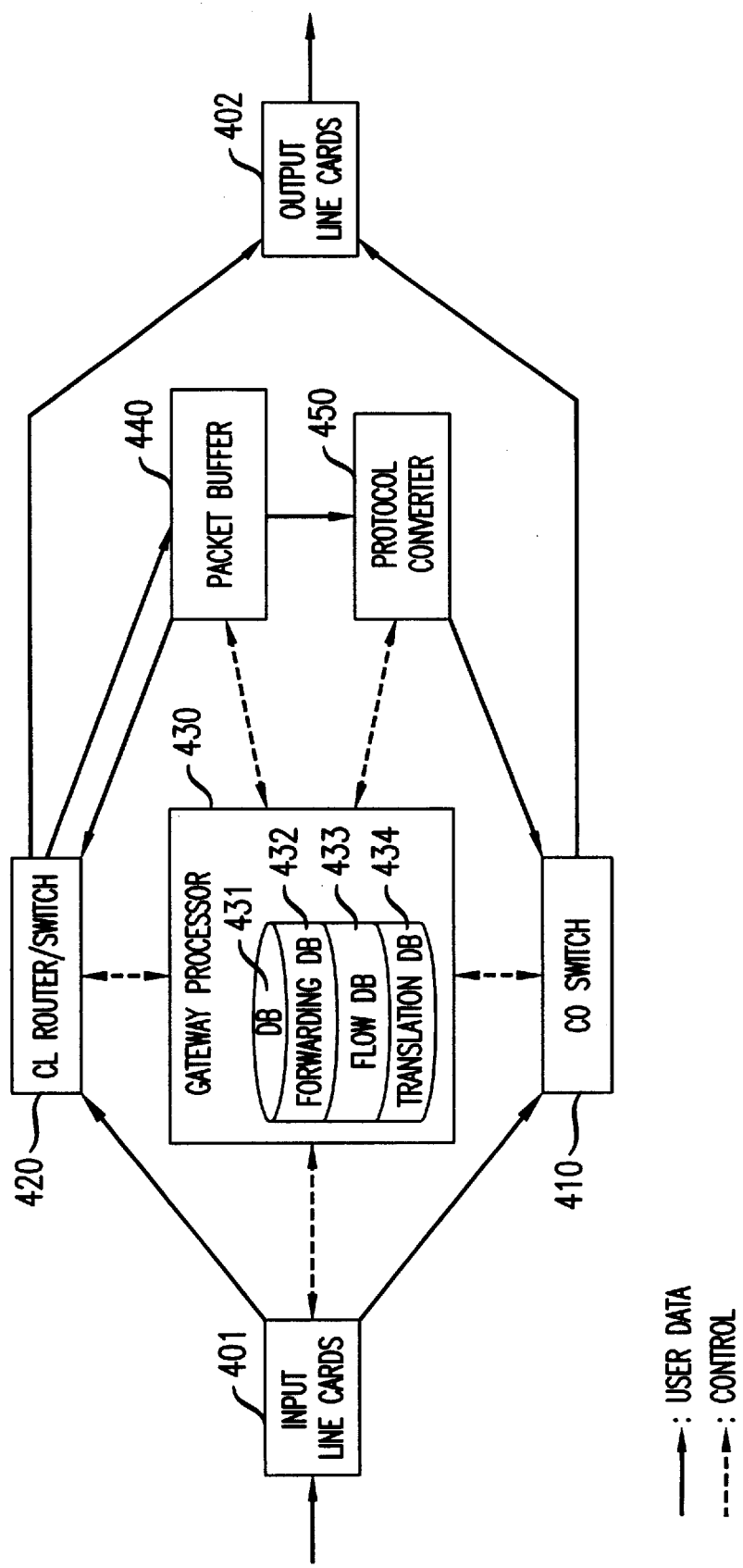
FIG. 4 is a block diagram illustrating the internal arrangement of CL-CO gateway arranged in accordance with the present invention.

FIG. 4 shows the internal arrangement of CL-CO gateway 140 in accordance with the present invention. Generally speaking, each CL-CO gateway arranged in accordance with the present invention includes hardware and software modules that typically comprise (a) a switch fabric for CO networking, shown in FIG. 4 as CO switch 410, (b) a CL packet forwarding engine, shown in FIG. 4 as CL router/switch 420, (c) a protocol converter 450, (d) a moderately sized packet buffer 440 for temporarily storing packets waiting for CO network setup or turnaround; and (e) a processor 430 and associated database 431 for controlling the gateway packet handling operations and for storing forwarding, flow control, header translation and other information. Input line cards 401 and output line cards 402 connect the gateway of FIG. 4 to external networks, such that datagrams received in input line cards 401 can be directed either to CO switch 410 or CL router/switch 420, and such that output line cards 402 can receive datagrams from either of the last mentioned elements and direct them to external networks.

In FIG. 4, the paths over which user data is communicated are shown as solid lines, while the paths over which control signals are communicated are shown as dashed lines. As will be seen from FIG. 4, and as described in more detail below, control over almost all of the elements in FIG. 4 is provided by processor 430. Persons skilled in the art will appreciate that such control occurs by virtue of stored programs which are appropriately arranged to perform the functionality described herein. Numerous specific programs may be devised to accomplish this purpose. While all of the elements in FIG. 4 can be implemented principally in hardware, it is to be understood that some of the elements such as CL router/switch 420 and protocol converter 450 may be implemented in software.

Before proceeding with a detailed description of the operation of the gateway of FIG. 4, it will be instructive to describe in general some of the functions and characteristics of the elements of the gateway. Specifically, buffer 440 in FIG. 4 is of moderate size, much smaller than would be required in prior art arrangements. This is because in prior art arrangements, the buffer would be required to store all of the arriving CL datagrams while a path through the CO network is being set up. In contrast, buffer 440 needs only to be of sufficient size to store datagrams that arrive during the period when the arriving datagrams are either "turned around", or until "foolers" are generated and acted upon, thereby temporarily slowing down or halting the flow of new datagrams into the gateway. Note that the buffers needed for the normal operation of CL router/switch 420 and CO switch 410 (if the CO network is packet-switched) are not shown.

Protocol converter 450 is a typically a software implemented process in which the user payload is extracted from an IP datagram, and converted to the CO format, so that it can be carried directly on connections in the CO network. For example, if the CO network is an ATM network, then application data needs to be converted to the AAL5 format so that it can be carried through the ATM network. Since AAL5 performs transport-layer functions, the TCP header can also be converted to an AAL5 header in a switched (rather than provisioned) ATM network. In other words, TCP/IP headers are converted into AAL5 /ATM headers. By doing this, it appears that TCP connections are terminated at the CL-CO gateways from each endpoint of the communication, and a connection of the type supported by the CO network is set up between the CL-CO gateways, such as gateways 140 and 150 of FIG. 1.

Database 431 includes a series of individual databases arranged to store information used in various of the functions performed by processor 430, and may include, as an example, a datagram forwarding database 432, a flow database 433, and a header translation database 434.

Datagram forwarding database 432 is the database used in typical CL IP routers. It stores the next hop router address and outgoing port number corresponding to each destination address. Typical fields in each record in this database would be: Destination IP address; Next hop router; Outgoing port (interface).

Flow database 433 stores information used to determine how to handle packets from flows requiring a connection-oriented service. Typical fields in each record in this database include: (a) an outgoing port field, which indicates the port on which a datagram whose entries match a particular record's entries is forwarded; (b) if the outgoing port is "invalid," the next field "forward or hold") entry indicates whether packet should be forwarded or held in packet buffer 440; (c) destination address; (d) source address; (e) source port; (f) destination port; (g) type of service; (h) protocol field; (i) TCP Flags; (j) outgoing port; (k) forward or hold flag, and (l) a mask which indicates which of the data entries is applicable to the particular record.

Header translation database 434 indicates the incoming CL packet header field values and the corresponding CO packet header field values or circuit identifiers, based on whether CO switch 410 is packet-switched or circuit-switched, respectively.

At a very high level, the processes performed in CL-CO gateways that enable the internetworking of connectionless IP networks and CO networks operated in a switched mode, in accordance with this invention, accomplish two primary functions: first, performing user-plane actions to handle IP packets that arrive at CL-CO gateways to be carried on (not-yet-established) connections in the CO network, plus IP packets that arrive at CL-CO gateways but then remain in the CL network, and second, creating routing tables that enable data flow from the CL network to the CO network. Note that both the parallel and series internetworking configurations shown in FIGS. 1 and 2 need the set of "user-plane" actions, while only the "parallel" configuration of FIG. 1 needs the set of "routing" actions. In FIG. 2, there is only one option for routing packets between the CL networks, i.e., through the CO network. Hence, no special routing actions are needed to create data flows to the CL-CO gateways.

FIGS. 5–8 are flow diagrams illustrating in more detail the processes used during operation of a gateway arranged in accordance with the present invention. Before considering these processes in detail, it will be instructive to again provide an overview of the high-level strategy of the present invention. In accordance with the present invention, different types of treatments are afforded to different types of CL traffic. Specifically, CL traffic can generally be of at least the following different types: (i) TCP SYN (SYNCHRONIZE) segments, (ii) TCP data segments that arrive at a CL-CO gateway without a preceding TCP SYN segment (e.g., because the IP routing tables change after the TCP SYN was sent), (iii) UDP datagrams from applications that have an initial end-to-end exchange (such as H.245 exchanges before multimedia data is sent in UDP datagrams), and (iv) UDP datagrams from applications without such an exchange.

Advantageously, the present invention intercepts and holds a TCP SYN (Synchronize) segment at the CL-CO gateway while a connection is being set up in the CO network.

For TCP data segments that arrive at CL-CO gateways without a preceding TCP SYN segment (e.g., due to routing table changes), the present invention uses "TCP foolers" to indicate a zero receive-window size, thus "halting" data flow until the connection is set up. These foolers in essence constitute a signal that is communicated to the source of the packets requesting the source to slow down or stop transmission of datagrams during the time period when the gateway is establishing a path through the CO network.

Application protocol message indications are used to trigger the setup of connections for UDP traffic from applications that have an initial end-to-end exchange. For example, an H.245 open logical channel message is sent end-to-end prior to sending RTP (Real Time Protocol) data as UDP datagrams if H.323 is used in conjunction with RTP for multimedia communication.

Finally, for UDP datagrams from applications without initial end-to-end exchanges, two schemes can be used while setting up connections: First, the gateway can turn back IP datagrams to the CL network using IP source routing to override routing tables at the routers. Alternatively, the gateway can use a set of small-bandwidth provisioned connections for such datagrams.

Figure 5:
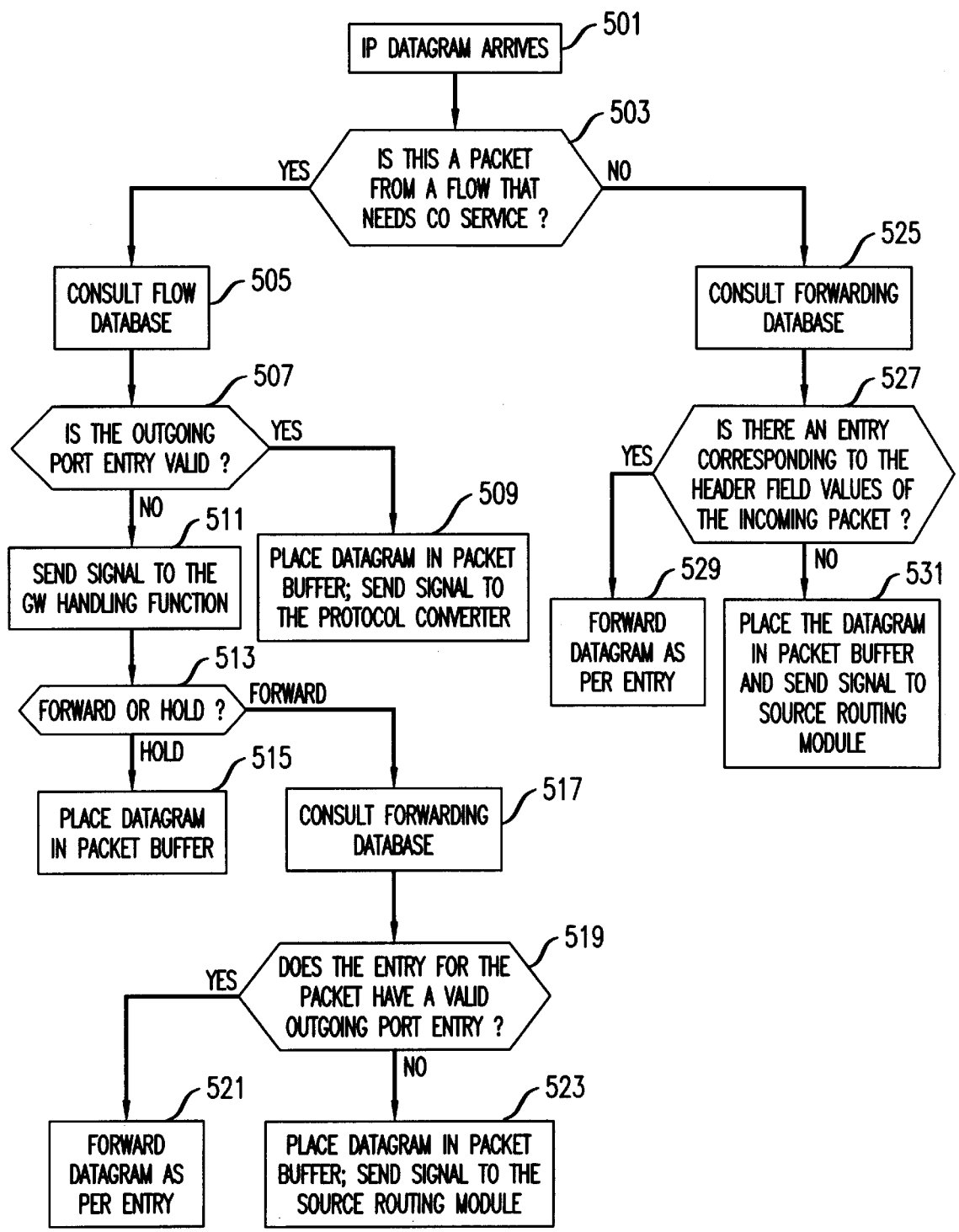
FIG. 5 is a flow diagram illustrating the steps performed when the gateway of FIG. 4 performs its packet forwarding process.

When an IP datagram arrives at the CL-CO gateway of FIG. 4, the handling procedure that occurs in CL router/switch 420 is shown in FIG. 5. CL packets arriving on the input line cards 401 in step 501 are sent to CL router/switch 420, while a determination is made by gateway processor 430 in step 503 as to whether the flow should be handled via the CO network or not. If the logic in processor 430 determines to use the CO network for a given flow, a "YES" result is achieved in step 503, and flow database 433 is consulted in step 505. If flow database 433 determines that there is a record whose entries match the incoming packet header fields, a YES result occurs in step 507, and the packet is sent to packet buffer 440 in step 509. Concurrently, a signal is sent to the protocol converter 450. On the other hand, if the outgoing port entry is invalid, a NO result occurs in step 507; this indicates that a connection needs to be set up. A signal is sent to processor 430 in step 511, to initiate a gateway "handling function", described in more detail below in connection with FIG. 6.

A determination is next made in step 513 as to whether the "Forward or Hold" entry in the appropriate record in flow database 433 is "Forward" or "Hold". If, for example, if the packet is a UDP datagram from an application that does not have an end-to-end handshake, a "Forward" result will occur in step 513, and the gateway processor 430 will cause the packet to be forwarded based on the entry in forwarding database 432, as determined in step 517. If the entry determined in step 513 is "Hold," the datagram is held in packet buffer 440, as shown in step 515. After forwarding database 432 is consulted in step 517, a determination is made in step 519 as to whether there is a valid outgoing port for the datagram stored in packet buffer 440. If a YES result is obtained in step 519, the datagram is forwarded in accordance with the entry, in step 521. Otherwise, a NO result is obtained in step 519, and the datagram is placed in packet buffer 440 in step 523. Concurrently, a control signal is sent to the source routing function in processor 430.

If the flow classification functionality within processor 430 determines that the packet should be handled in a CL mode, a NO result occurs in step 503. In that event, forwarding database 432 is consulted in step 525 to determine if there is an entry corresponding to the header field values of the incoming datagram. If the result of step 527 is YES, indicating that there is an entry in forwarding database 432 that matches the incoming packet header fields, the datagram is forwarded in accordance with that entry, in step 529. Otherwise, if a NO result occurs in step 527, the datagram is dropped in step 531.

Figure 6:
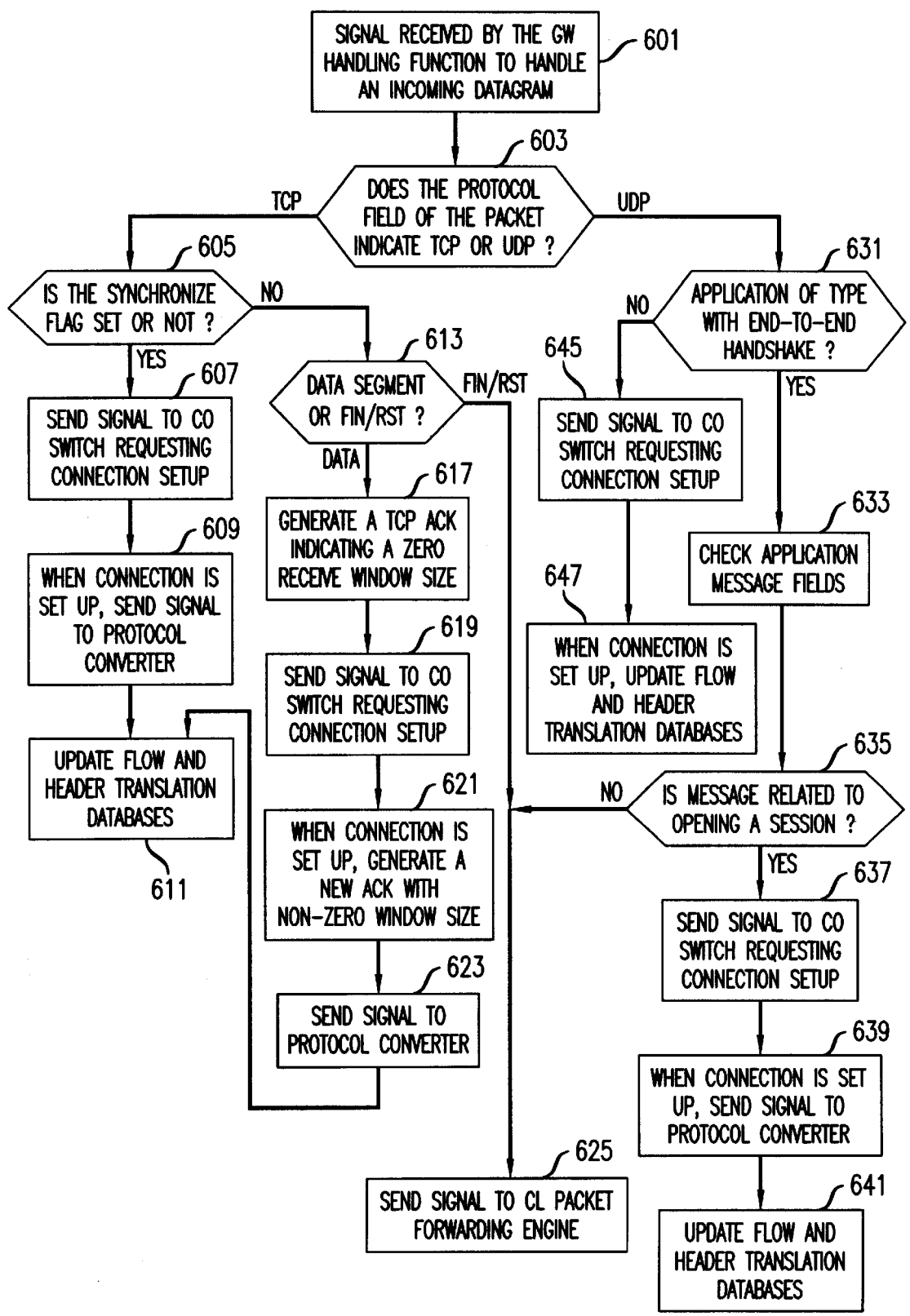
FIG. 6 is a flow diagram illustrating the steps performed when the gateway of FIG. 4 performs its gateway handling process.

Referring now to FIG. 6, there is shown a flow diagram of the packet handling function performed by processor 430 when an incoming packet placed in packet buffer 440 requires attention. Packets for which a signal is received at the GW handling function are classified in step 603 as being either TCP or UDP. If the result in step 603 indicates a TCP datagram, a determination is made in step 605 as to whether or not the datagram is a TCP SYN packet, on the one hand, or TCP data or TCP FIN/RST message on the other hand. For a TCP SYN packet, the process proceeds to step 607, where a signal is sent to CO switch 410 requesting a connection setup through the CO network. When the connection has been set up, a control signal is sent to protocol converter 450 in step 609, and, in step 611, the entries in flow database 433 and translation database 434 are updated.

If it is determined in step 605 that the TCP datagram is not a SYN packet, a further classification is made in step 613 as to whether the datagram is a data segment or a FIN/RST message. If the result of step 613 is an indication of DATA, a TCP acknowledgement indicating a zero receive window size is generated in step 617. This in essence fools the node transmitting to the gateway, thereby holding up further transmissions. As stated previously, in some circumstances, it is possible for a gateway to receive a TCP data segment without having seen a corresponding SYN segment. This could happen, for example, as a result of routing table changes. When this does happen, the gateway of the present invention generates a "TCP fooler". Specifically, in this circumstance, the CL-CO gateway immediately generates an ACK (acknowledgment) segment with the window size set to 0, to cause the sending endpoint to stop sending data.

Once a new connection is set up in the CO network, a new ACK can be sent by the CL-CO gateway with a non-zero window size. While the connection is being set up, if the persist timer, as described in W. R. Stevens, "TCP/IP Illustrated Volume 1, The Protocols," Addison-Wesley Professional Computing Series, 1994, happens to send a query to determine if the window size has been increased, the CL-CO gateway intercepts the query and responds to it. If the persist query happens to get routed through a different path and the destination endpoint answers indicating a non-zero window size, then TCP segments for the flow may again start to appear at the CL-CO gateway before connection setup is complete. If this happens, the CL-CO gateway will simply send another TCP fooler (i.e., an ACK with window size set to 0).

The process proceeds to step 621 after the connection through the CO network is set up, generating a new acknowledgement message resetting the window size to a non-zero (more appropriate) value. The process proceeds to step 623, in which a signal is transmitted to protocol converter 450, so that the protocol used by the incoming data packets can be appropriately converted. Records in flow database 433 and translation database 434 are then appropriately updated in step 611.

If the TCP datagram is a FIN/RST segment, the process of FIG. 6 proceeds from step 613 to step 625, in which a signal is transmitted to the CL router/switch 420, indicating that the FIN/RST packet should be forwarded through the CL network.

In accordance with the present invention, the handling of UDP datagrams is application-dependent. UDP is currently primarily used for support applications, such as DNS (Domain Name Service) and SNMP (Simple Network Management Protocol), rather than any primary applications, such as web access, telnet, file transfer, electronic mail, etc. However, for Internet telephony and other multimedia traffic, RTP (Real Time Protocol) has been defined to use UDP. This is a primary application in that significant user data can be expected to be generated. To handle this latter type of UDP datagram, connections are set up when certain H.245 messages, such as open logical channel messages, arrive at CL-CO gateways. These H.245 messages, part of the H.323 protocol suite that supports multimedia applications, are typically sent end-to-end to assign UDP port numbers for audio and video traffic. These messages can be treated in a manner similar to TCP SYN segments as triggers for connection setups at the CL-CO gateways. More information relating to the H.323 protocol suite can be found in G. A. Thom, "Draft Recommendation H.323 V2," ITU-T SG 16 Contribution, Jan. 21,1998.

If it is determined in step 603 that the incoming packet is a UDP datagram, a determination is next made in step 631 as to whether the datagram is from an application that has an end-to-end handshake prior to data transfer, or a UDP datagram from an application that does not have such a handshake. This test is made because, based on the packet type, the gateway selects the corresponding "halting" or "turning around" action to take. If the result in step 631 is YES, the application message fields are checked in step 633, so that a determination can be made in step 635 as to whether the message is related to opening a session. If so, a YES result occurs in step 635, after which the gateway sends a signal in step 637 requesting connection setup. When connection setup is complete, a signal is transmitted to protocol converter 450 in step 639, and the information in flow database 433 and translation database 434 is updated in step 641.

For UDP datagrams from applications that do not have an end-to-end handshake, a NO result occurs in step 631. These message are not "held" in packet buffer 440 while the connection is being set up. Accordingly, in step 645, a signal is sent to CO switch 410, requesting call setup in the CO network. When the connection has been set up, the information in flow database 433 and translation database 434 is updated in step 647.

As stated above, in most cases, gateway processor 430 initiates the set up of a connection. However, there are a few cases when this is not done. If the packet is a TCP FIN or RST, these packets identify the closing of a flow rather than a call set up. For these packets, gateway processor 430 simply sends a signal to CL router/switch 420 requesting it to forward the packet as a CL datagram. The latter handles such packets using the actions illustrated in FIG. 7. Specifically, in step 701, CL router/switch 420 receives a signal from gateway processor 430 to handle a packet or datagram. In step 703, the forwarding database 432 is consulted. If it is determined in step 705 that there is a valid outgoing port entry in the database, the datagram is forwarded in accordance with that entry, in step 709. If there is not a valid entry in the database, the datagram is placed in packet buffer 440 in step 707, and a signal is sent to the processor 430 to forward these packets on the CL network using source routing.

Figure 9:
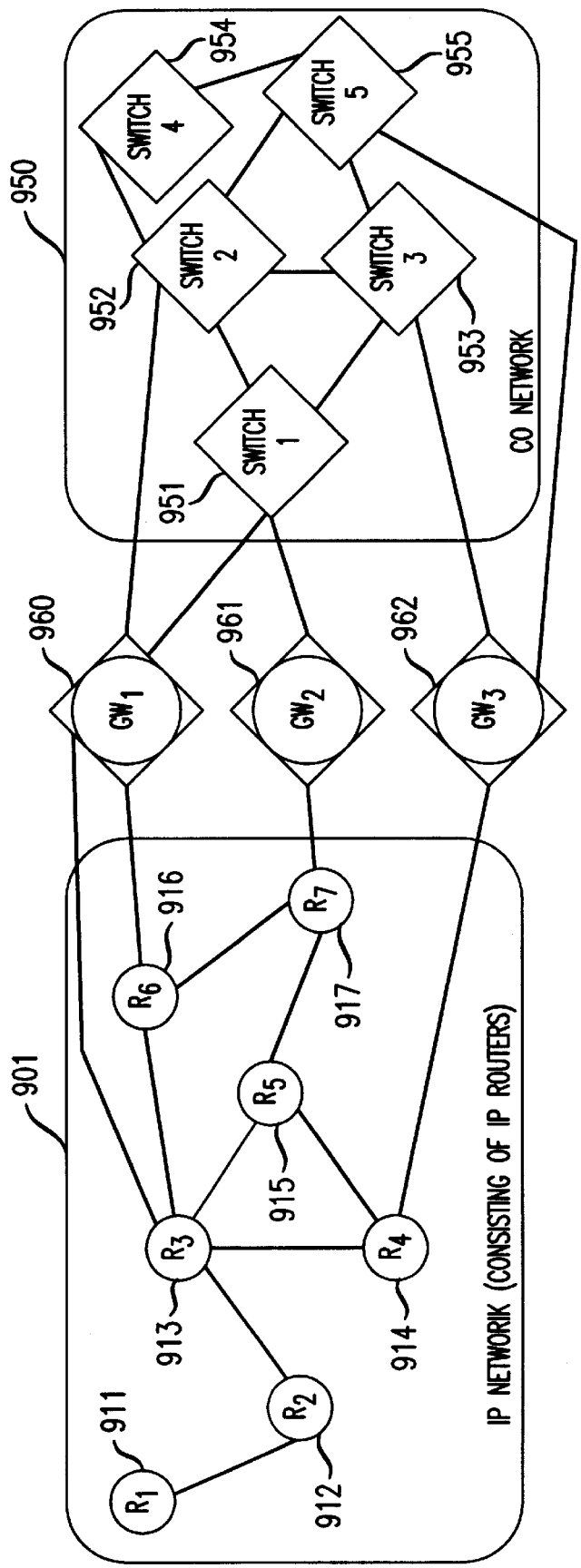
FIG. 9 illustrates an example of the interworking of an IP network and a switched CO network.

To avoid looping of datagrams that are turned around and sent back to the IP network, source routing is used to force intermediate routers to use the source route carried in the datagram header instead of the path indicated by their precomputed routing tables. Referring to FIG. 9, source routing is illustrated, for example, where a message is being sent from an endpoint connected to node 914 to an endpoint connected to node 917. If CL-CO gateway 962 detects one of the cases for invoking this technique, it will add a source route "node 914 to node 913 to node 915 to node 91.7" to the datagram and send it back on the interface to node 914. This route may be chosen because it is the "shortest path" (from the point of view of minimizing a function such as path hops or link weights) between nodes 914 and 917 that does not include gateway 962. Nodes 914, 913 and 915 will route the datagram according to the source route rather than their precomputed routing tables. The first few datagrams follow this route while gateway 962 initiates the setup of a connection through CO network 951. Once established, the connection will carry the IP datagrams to node 917 through CO network 951.

It is interesting to note that this approach of using source routing to override precomputed routing tables can be used even within CL network 901 whenever there is congestion. In other words, if a precomputed route becomes overly congested, a router can use this option of creating a source route on the alternate path and thereby override the precomputed routing tables. While the source-routing scheme just described works in some applications, it is understood that a source routing capability is not enabled in many existing routers, even when the routers are equipped with the required software. In such cases, an alternate solution is needed for handling UDP datagrams generated by applications without initial end-to-end exchanges but requiring a connection.

For such cases, we arrange or provision small-capacity pipes through the CO network between pairs of CL-CO gateways that are announced as having links by the IP routing protocol. The capacities of these provisioned connections can be adjusted based on usage. In addition, it is important to recognize that only the first few UDP datagrams need to use the provisioned connection. Once the switched connection through the CO network is established (perhaps using the same route as the provisioned connection), then the latter will carry the remaining UDP datagrams through the CO network. Consequently, the capacity needed for provisioned connections is small.

Figure 7:
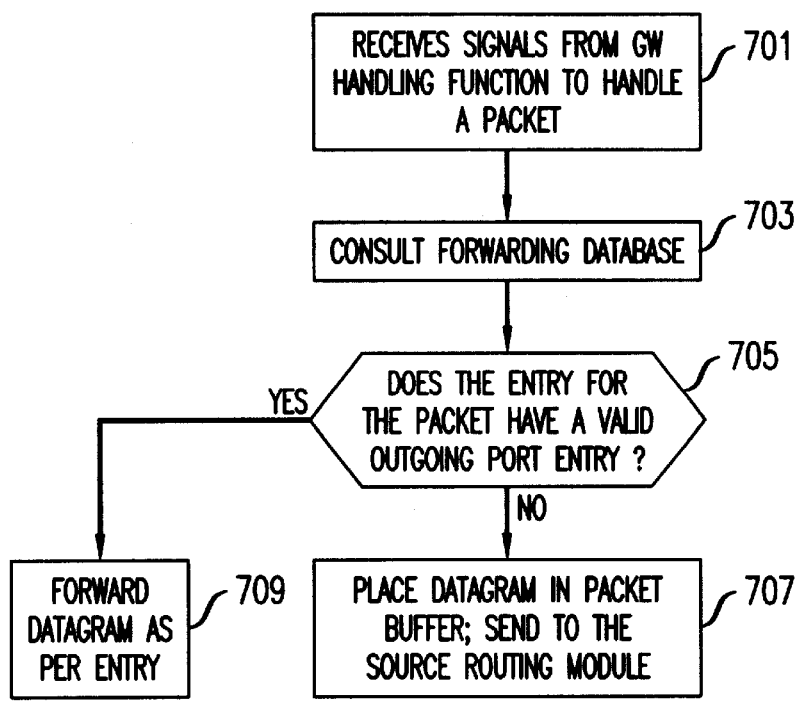
FIG. 7 is a flow diagram illustrating the steps performed in CL router/switch 420 of FIG. 4 when the gateway of FIG. 4 determines to forward a datagram or store it temporarily in buffer 440.

Other examples of packets handled in the manner shown in FIG. 7 are messages from UDP applications that have an end-to-end handshake but are not related to opening a session. Such messages get routed to gateway processor 430, but since these are not related to opening a session, they do not need to be held up, and can be forwarded in the CL mode. Also, packets from flows for which it is decided not to use a connection are handled in this manner.

Figure 11:
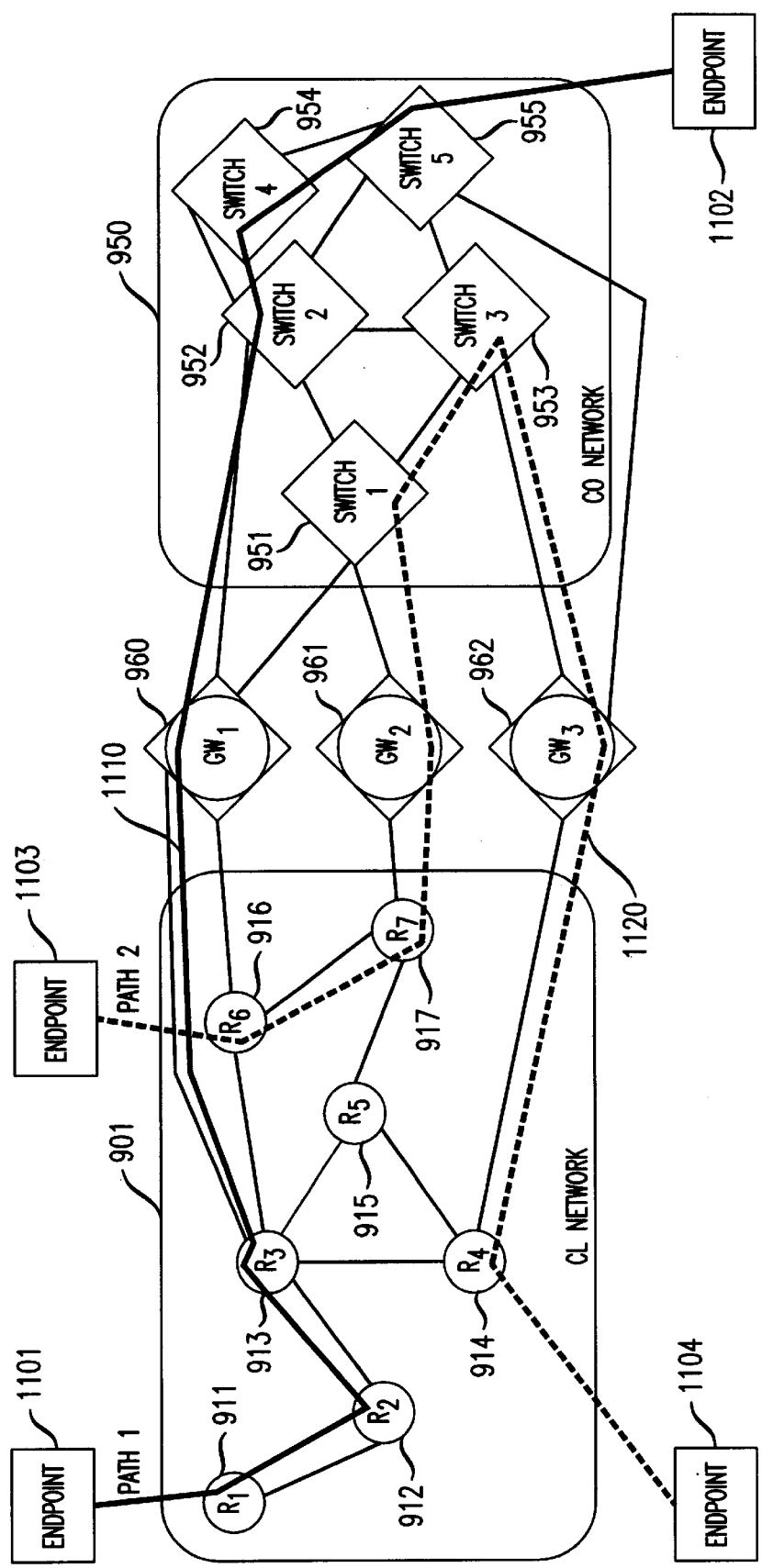
FIG. 11 illustrates two different "types" of paths through the network of FIG. 9, in order to explain protocol conversion in connection with the present invention.

For packets for which a signal is received at protocol converter 450, the converter consults the protocol header translation database 434, selects the appropriate entry and generates CO packets or data for CO circuits. These are then passed on to CO switch 410 and output line cards 402. Details of protocol conversion are discussed below in connection with FIG. 11.

An alternative method to deal with packets that show up at a CL-CO gateway while a switched connection is being set up in the CO network to the far-end CL-CO gateway is to use "backpressure" flow control signals in the CL network, so that packets will be "halted" from reaching (and overflowing) the CL-CO gateway, until the connection is established. In the meantime, the packets will be buffered at routers in the CL network, until the flow control signals permit the packets to reach the CL-CO gateway again. Unfortunately, in some situations, this flow control may temporarily stop all traffic on a link, not just packets of the new connection. It is preferred to use a "selective" flow control signal that only halts (on the link into the CL-CO gateway, or back to the generating endpoint) packets associated with the new connection.

One simple example of a backpressure flow control signal is the PAUSE function that is used to implement flow control on full-duplex Ethernet links (including the recent gigabit Ethernet standard). A router (such as a CL-CO gateway) that needs to temporarily inhibit incoming packets (e.g., while it sets up a connection in the CO network) simply sends a PAUSE frame that indicates how long the full-duplex partner should wait before sending more packets. The router or endpoint that receives the PAUSE frame stops sending packets for the period specified. PAUSE periods can either be extended or canceled (by the CL-CO gateway) by transmitting another PAUSE frame with the revised PAUSE parameter.

Releases of connections in CO network 950 are initiated if there is no traffic for a given time period. FIN (Finish) segments and RST (Reset) segments, which are TCP segments used for normal and abortive releases, respectively, cannot be counted on to initiate connection release in the CO network because routes may change in CL network 901 during the lifetime of the TCP flow. Furthermore, there may be advantages to keeping connections in the CO network open longer than the lifetimes of TCP flows. For example, in typical HTTP (Hypertext Transfer Protocol) implementations, a new TCP connection is created for each transaction and terminated as soon as the transaction completes, as discussed in W. Stallings, "Data and Computer Communications Fifth Edition, Prentice Hall 1997." However, often there will be several consecutive transactions from a client to a web server; hence, keeping the connection open even after the TCP flow has been terminated could simplify the setup actions required when a subsequent TCP flow arrives.

Figure 8:
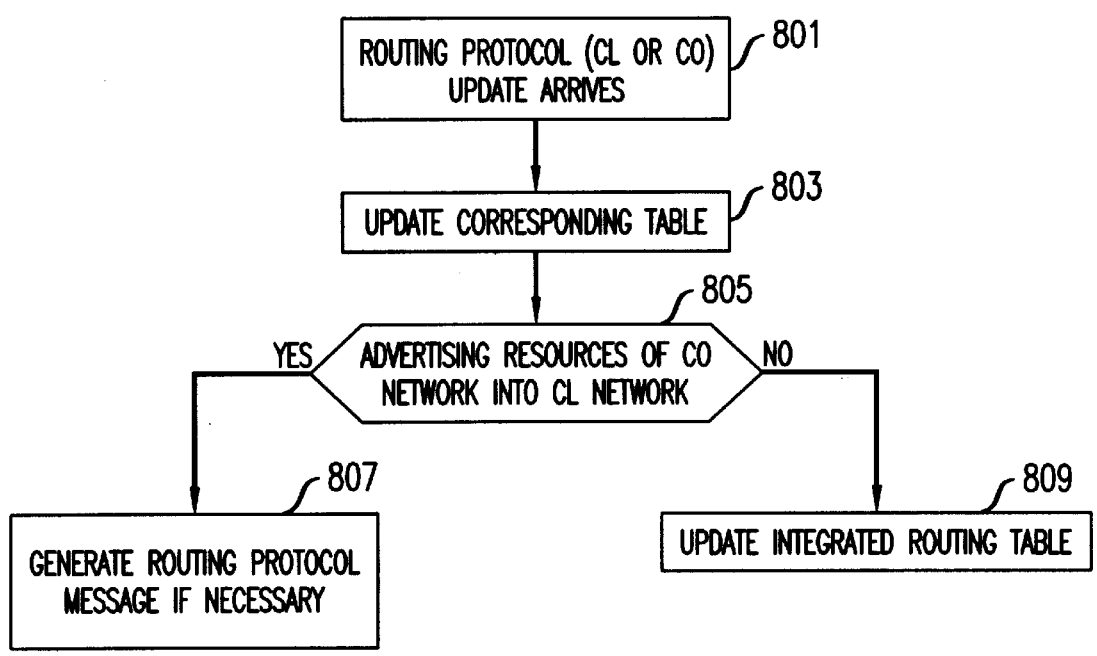
FIG. 8 is a flow diagram illustrating the routing related processes performed in the gateway of FIG. 4.

FIGS. 5–7 described the user-plane actions performed at the gateways of the present invention. Now we describe the second set of functions performed in the gateways, i.e., the routing related functions. When a routing protocol update is received from CL router/switch 420 or from CO switch 410, network, the process shown in FIG. 8 is executed. After the update arrives in step 801, and the corresponding table is updated in step 803, a determination is made in step 805 as to whether the resources of the CO network need to be communicated to or "advertised" in the CL network. If so, a YES result occurs in step 805, and an appropriate routing protocol message is generated in step 807. If not, a NO result occurs in step 805, and the integrated routing table is updated in step 809.

As stated previously, CL-CO gateways arranged in accordance with the present invention perform two principal functions: first, they act as nodes in a CL network (e.g., as IP routers) that are equipped to decide when to redirect traffic on to a switched CO network, and second, they act as nodes of the CO network, and therefore execute the routing and signaling protocols of the CO network. For example, a CL-CO gateway between an IP network and a WDM network is both an IP router and a WDM optical cross-connect or add/drop multiplexer. This dual functionality is best described in conjunction with FIG. 9, which is an example of the interworking of an IP network and a switched CO network.

In FIG. 9, IP network 901 includes a series of seven interconnected IP routers, 911–917, while CO network 950 includes a series of five interconnected switches, 951–955. The number of routers and switches, and their specific interconnection arrangement, is illustrative only. Three gateways 960–962 (each of which could be arranged in accordance with the present invention) interconnect networks 901 and 950. Gateway 960 is shown as having two connections to each of networks 901 and 950, while gateway 961 is shown as having only a single connection to those networks. Again, this is exemplary, and many different architectures are possible.

There are two ways to create the routing tables that will enable data flow from CL network 901 to CO network 950: first, CO network 950 can be represented as a "non-broadcast network" in the IP routing protocol (this affects routing information at CL-CO gateways 960–962 and other routers); second, integrated routing tables for both the IP and CO networks 901 and 950, respectively, can be maintained at the CL-CO gateways 960–962. A third scheme, described below, which allows for user-specific routing information to be maintained at the CL-CO gateways 960–962, can be used in conjunction with either of the above two approaches. Each of the two approaches will be described in turn.

With respect to representing CO network 950 as a non-broadcast network, consider the OSPF (Open Shortest Path First) routing protocol described by J. Moy, "OSPF Version 2," IETF RFC 2178, July 1997, and commonly used in IP networks. In the most common configurations, routers running OSPF are connected via point-to-point links or broadcast networks, such as Ethernet. However, OSPF also allows routers to be interconnected via non-broadcast networks. A common interpretation of the term "non-broadcast network" is a switched CO network, such as an X.25 network or ATM network. Thus, OSPF allows routers to be interconnected via a CO network without provisioned connections; provisioned connections are treated merely as point-to-point links by OSPF. To handle non-broadcast networks, two modes of operation are recommended in the OSPF specification: (i) NBMA (Non-Broadcast Multi-Access) and (ii) point-to-multi-point. In the NBMA mode, the non-broadcast network emulates a broadcast network and assigns designated routers (and backup designated routers) to generate network state advertisements, while in the point-to-multipoint mode, the non-broadcast network is advertised as a set of point-to-point links between some of the routers on the non-broadcast network. Using either of these modes, CO network 950 can be represented as part of the CL network 901 topology. Routing tables constructed in the IP routers 911–917 (including the CL-CO gateways 960–962) take into account the presence of the non-broadcast network, and enable traffic to flow from CL network 901 to CO network 950 and back to the CL network if paths through the CO network are "shorter" according to some measure of interest.

For purposes of this discussion, we assume that the CO network 950 is operated in a point-to-multipoint mode. Use of the NBMA mode is equally applicable. Also, while the description below assumes the OSPF routing protocol, the concept is readily applicable to other IP routing protocols.

Figure 10:
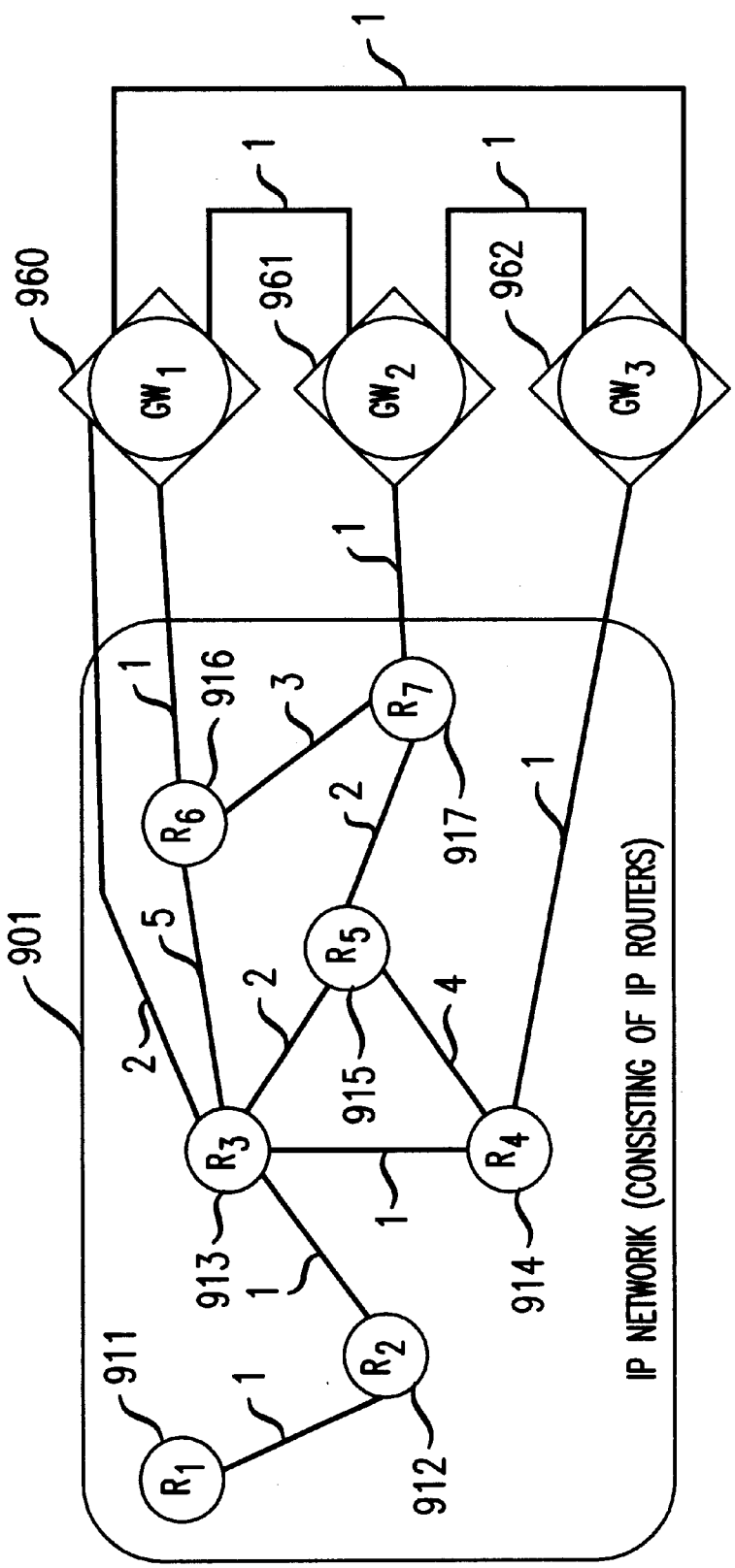
FIG. 10 shows the same network as illustrated in FIG. 9, from the point of view of the CL network, and illustrates link weights in the links between routers.

Referring still to the network of FIG. 9, the concept of having CL-CO gateways 960–962 generate Link State Advertisements (LSAs) that report point-to-point links between themselves even when there are no connections between the CL-CO gateways, is illustrated. For example, gateway 960 sends an OSPF LSA to router 916, indicating that it has direct links to gateways 961 and 962 (acting as routers). The links reported in the LSAs appear in the OSPF topology database of all the routers in the same OSPF area and have associated link weights. In the network of FIG. 9, the network view of all the IP routers (including the CL-CO gateways 960–962) could be as shown in FIG. 10, in which the weight shown next to each link is an operator-assigned link weight. In this example, the shortest path from router 914 to router 917 is the path: from router 914 to gateway 962 to gateway 961 to router 917, while the shortest path from router 914 to router 915 is the path: from router 914 to router 913 to router 915. Thus, based on the link weights, part of the end-to-end path can be taken through the CO network 950, or the entire end-to-end path may be taken through the CL network 901. For paths that take gateway-to-gateway links, connections need to be set up through CO network 950 (from CL-CO gateway to CL-CO gateway) when data arrives at any of the CL-CO gateways 960–962. Note that in FIG. 10, (unlike FIG. 9) gateways 960–962 are explicitly shown as being connected to each other.

Turning now to a discussion of a technique in which integrated IP-CO routing tables are maintained at the CL-CO gateways, no announcements are made about CO network 950 by the CL-CO gateways 960–962. Packets only appear at a CL-CO gateway if it is part of the shortest path according to the IP routing tables. Besides the IP and CO routing tables, CL-CO gateways 960–962 also maintain a routing table that integrates information about the CL and CO networks 901 and 950, respectively. Each CL-CO gateway 960–962 determines shortest paths to IP destinations by comparing its path on the two networks for each destination. The shorter of the two paths is maintained at the CL-CO gateway in an integrated IP-CO routing table for each destination address. Given that the CL-CO gateway is an IP router, it needs to maintain a database of routes to IP addresses that do not make use of CO network 950, since these databases are synchronized between adjacent routers. However, the shortest path used is that indicated in the integrated IP-CO routing table.

For example, the OSPF topology database maintained at the IP routers in FIG. 10 would not know about the three links between CL-CO gateways 960–962. If router 916 needs to send data to router 914, it will send it through gateway 960 with the expected route of router 916 to gateway 960 to router 913 to router 914. However, the integrated IP-CO routing table in gateway 951 indicates that a shorter path exists to router 914 via gateway 962, and, consequently, the data will follow the path from router 916 to gateway 960 to gateway 962 to router 914.

Notice that this integrated routing scheme requires that a CL-CO gateway be at least double-homed in to CL network 901 in order for it to receive any transit packet (not destined for itself) from the CL network; otherwise, it could not be part of the shortest path according to the IP routing tables. Furthermore, since the availability of CO network 950 is unknown to the IP routers, the amount of traffic that will be sent to the CL-CO gateways 960–962 will probably be smaller than can be handled by CO network 950.

As stated previously, one advantage of CL-CO gateways arranged in accordance with the present invention is to allow users to exploit the advantages of CO and CL networks without having to change their existing applications. If users specify their desired service requirements at subscription time, the network provider can set user-specific routing tables at CL-CO gateways 960–962. Once data is directed to CL-CO gateways 960–962 from IP routers or other sources of CL traffic based on generic routing tables (using either of the schemes described above), the user-specific routing then determines which users' flows are sent to the CO network.

As stated previously, gateways in accordance with the present invention decide whether a datagram flow should be handled via the CO network or not. (See step 503 in FIG. 5). If the routing scheme used maintains integrated IP-CO routing tables at the CL-CO gateways, neither type of traffic poses a serious problem, since the default path expected by CL network 901 provides a path from the CL-CO gateways 960–962 through CL network 901 to the destination. For traffic for which a connection is set up, packets can be forwarded on the CL network while a connection is being set up. However, if the routing scheme in which CO network 950 is represented as a non-broadcast network is used, then both types of traffic—flows for which a connection is set up and flows for which a connection is not set up—pose a problem. First, for traffic that requires a connection, a situation unnatural to CO networks arises in that user data is presented to a CO network without a request for connection setup. Typically, this does not happen. For example, we do not start speaking into a phone before dialing. Similarly, a connection is first set up from a personal computer (PC) to an IP router through the telephony network (for PCs with modem access to the Internet), and then an IP application (one that generates IP traffic), such as a web browser, is started at the endpoint PC.

Second, if the routing scheme in which CO network 950 is represented as a non-broadcast network is used and a connection is not set up for a particular traffic flow, then that traffic needs to be forwarded through CL network 901. However, shortest paths as computed by the IP routers using this routing scheme may require the use of links between CL-CO gateways 960–962 that do not actually exist. Methods to handle both types of traffic (flows for which connections are set up and those for which no connection is set up) were described in connection with FIGS. 5–7.

As stated previously, one motivation for arranging CL-CO gateways in accordance with the present invention is to allow users to exploit the advantages of CO and CL networks without having to change their existing applications. Thus, if users specify their desired service requirements at subscription time, the network provider can set user-specific routing tables at the CL-CO gateways. Once data is directed to CL-CO gateways from IP routers based on generic routing tables (using either of the schemes described above), the user-specific routing-then determines which users' flows are sent to the CO network.

Finally, to reduce layer overheads and thus improve bandwidth utilization, user-plane protocol conversion is used instead of protocol encapsulation for TCP and UDP flows that are handled with switched connections through the CO network. This technique, described in more detail below, can be used in conjunction with any of the above-listed techniques for flows handled through the CO network with switched connections. IP headers are essentially overhead bytes needed to route packets through the IP network. Accordingly, protocol conversion schemes can be used in the CL-CO gateways as a means to increase bandwidth or throughput. Protocol conversion is possible when the CO network is operated in a switched mode, and can be used in conjunction with the previously described schemes for flows handled through the CO network. Protocol conversion can be applied to both "parallel" and "interconnecting" configurations of FIGS. 1 and 2, all three CO networks 301, 311 and 321 shown in FIG. 3, and in conjunction with all the routing schemes discussed above. Furthermore, it can be used for both TCP and UDP flows.

The alternative to "protocol conversion" is "protocol encapsulation," which is used when the CO network is operated in a provisioned mode. By encapsulation, we mean that packets of one network are tunneled through the second network by adding headers for the second network on to the packets from the first network. For example, if the CO network in use is a provisioned ATM network, then an IP datagram (with its IP header) is encapsulated into an AAL5 frame, which is then segmented into ATM cells for transport through the ATM network. Recently it has been noted by K. Thompson, G. J. Miller, and R. Wilder, "Wide Area Traffic Patterns and Characteristics," IEEE Network Magazine, December 1997 that up to 45% of IP traffic in the backbone is either 40- or 44-byte-long datagrams. When these datagrams are encapsulated into ATM cells, due to LLC/SNAP encapsulation (see J. Heinanen, "Multiprotocol Encapsulation over ATM Adaptation Layer 5," RFC 1483, 1993), ATM cell and AAL5 overheads, each such datagram occupies two ATM cells. This leads to an overall bandwidth waste of 20% when IP datagrams are carried in ATM cells.

With protocol conversion, the user payload is extracted from the IP datagram and carried directly on connections in the CO network. For example, if the CO network is an ATM network, then application data is carried in an ML5 frame through the ATM network. Since AAL5 performs transport-layer functions, the TCP header can also be converted to an ML5 header in a switched (rather than provisioned) ATM network. In other words, TCP/IP headers are converted into ML5 /ATM headers. By doing this, it appears that TCP connections are terminated at the CL-CO gateways from each endpoint of the communication, and a connection of the type supported by the CO network is set up between the CL-CO gateways.

Protocol conversion is typically used when one endpoint of the communication is on one network and the other is on the second network. This is illustrated by path 1110 between endpoints 1101 and 1102 in FIG. 11, which shows the same networks, nodes and gateways that were depicted in FIG. 9.

For example, if a user with an Internet telephony PC connected to the Internet via an Ethernet link is communicating with a user that has a telephone, then voice signals sent by the Internet user are extracted from the IP datagrams in the CL-CO gateway node (CL-CO gateway 960 in FIG. 11) and carried directly on a DS0 circuit in the CO network 950, which is illustratively an STM network.

For the sake of completeness, it is to be noted that encapsulation is typically used when the two communicating endpoints are on the same network, but part of the transport is over a second network. This is illustrated by path 1120 between endpoints 1103 and 1104 in FIG. 11. In this case, encapsulation is used as an easy means of reconstructing the packet for transport on the first network at the far end. For the example shown in FIG. 11, CL-CO gateway 962 would easily extract the IP datagram from the ML5 frame and send it on its way through CL network 901 to endpoint 1104.

From the foregoing description of the present invention, it is seen that many advantages are achieved over the prior art. Specifically, the advantage to a user is that the user can ask for and receive a guaranteed quality of service for a specific flow. The advantage to a service provider is that bandwidth utilization in a packet-switched CO network is better than in a CL network with precomputed routes since bandwidth can be dynamically allocated to flows on an as-needed basis. These advantages only exist when the CO network is operated in a switched mode (i.e., some connection "setup" actions are performed for each arriving flow) rather than in a provisioned mode (where all these actions are performed a priori).

Various modification and adaptations may be made to the present In invention without departing from the spirit and scope thereof, which should be limited only by the appended claims. For example, in the previous discussion, we have described the CL-CO gateway as an entity distinct from the endpoints. However, it is within the scope of the present invention to include the CL-CO gateway functionality inside the endpoints. For instance, the CL-CO gateway could be implemented in a PC as a software module that sits between the Operating System with CO capabilities (such as Windows 98 and Windows NT 5.0, which have RSVP hooks) and applications running in the PC that assume the CL mode of operation.

One issue with the "switched" mode of operation of a CO network is the ability to process all the calls/flows that request connection setup. We have performed calculations that demonstrate that it is quite reasonable to assume that CO switches will have call handling capacities that are consistent with their user-date handling capacities. In addition, there is another (new) technique that can be deployed to alleviate/resolve call-processing overloads that may occur. The weights associated with links in the routing protocol can be dynamically adjusted in response to the loading of the call processors. Specifically, as the number of call-setup requests per second increases, the weight of the appropriate network link can be increased, so that future connections will tend to be routed away from this particular link (even though the link itself may not be "costly"). In other words, it is advantageous to divert connections away from overloaded call processors by appropriately keeping the connections away from certain network links.

In the preceding discussion, we mentioned the possibility of dynamically adjusting link weights in the routing protocol to divert connections away from overloaded call processors. The concept of dynamically adjusting link weights in the routing protocol can also be extended to include diverting connections away from congested links. In other words, link weights can be adjusted to reflect bandwidth availability.

What is claimed is:

1. A method of processing datagrams transmitted to a gateway from a source via a connectionless (CL) network, so that said datagrams can be transmitted from said gateway to a destination via a connection oriented (CO) network, said method comprising the steps of while a path through said CO network to said destination is being established, temporarily routing said datagrams to said destination via a path from said gateway back to said CL network, establishing said path for said datagrams through said CO network; and upon establishment of said path, terminating said temporary CL routing and applying newly received datagrams to said CO network.

2. The invention of claim 1, wherein, prior to said applying step, said method further includes the step of converting the protocol of said datagrams from a CL format to a CO format.

3. The invention identified in claim 2 wherein information obtained from said datagrams is passed to said CO network as parameters during said connection establishment step.

4. The invention of claim 1 wherein said destination is part of a second CL network and said connection path extends through a second gateway connecting said CO network to said second CL network, said method comprising the additional step of processing the datagrams received from the CO network to reverse any encapsulation or conversion processing performed in said first gateway prior to applying said datagrams to said CL network.

5. A method of processing connectionless (CL) datagrams received in a gateway from a CL network so that said datagrams can be transmitted to a destination, comprising the steps of determining if said CL datagrams should be diverted from said CL network and be routed to said destination via a connection oriented (CO) network, if said datagrams should be transmitted to said destination via said CO network, then storing ones of said transmitted datagrams in a buffer, said ones of said datagrams including datagrams received by said gateway prior to establishment of a path through said CO network to said destination, signaling said source of said datagrams to slow down or stop transmission to said gateway of additional datagrams destined for said destination, establishing said path for said datagrams through said CO network, and upon establishment of said path, applying datagrams stored in said buffer to said CO network.

6. The method of claim 5, wherein said determining step includes comparing the shortest path through said CL network with the shortest path through said CO network.

7. The method of claim 5, wherein said determining step includes performing classification with respect to the flow of said datagrams.

8. The invention defined in claim 5 wherein said determining step includes establishing user-specific routing tables at the CL-CO gateways, and when processing each datagram, consulting user-specific routing data in said routing tables to determine which users' flows are sent to the CO network.

9. A method of processing connectionless (CL) datagrams received in a gateway from a CL network so that said datagrams can be transmitted to a destination, said gateway including an IP router having a packet forwarding database, comprising the steps of determining if said CL datagrams should be directed from said CL network to said destination via a connection oriented (CO) network or a second CL network, if said datagram should be directed via a second CL network, consulting said packet forwarding database and forwarding said datagram in accordance with information stored in said database;

if said datagram should be transmitted to said destination via a CO network, then storing ones of said transmitted datagrams in a buffer, said ones of said datagrams including datagrams received by said gateway prior to establishment of a path through said CO network to said destination, examining the contents of said ones of said datagrams to extract information from the application or transport layer header fields in said datagrams;

initiating establishment of a path through said CO network to said destination using said information, and upon establishment of said path, applying datagrams stored in said buffer to said CO network.

10. A gateway for processing connectionless (CL) datagrams received in said gateway from a CL network so that said datagrams can be transmitted on a connection oriented (CO) network to a destination, said gateway including a database for storing mappings of destination addresses to logical channel identifiers on the CO network, and a signaling protocol module for requesting the set up and tear down of connections from said gateway to said CO network, said module being arranged so that while a path through said CO network to said destination is being established, datagrams are temporarily routing to said destination via a path from said gateway back to said CL network.

11. A CL-CO gateway for routing packets arriving from a connectionless (CL) network onto a connection oriented (CO) network, said gateway comprising interfaces to the CO network, interfaces to the CL network, a moderately sized packet buffer for temporarily storing packets waiting for CO network setup or turnaround;

a database for storing forwarding, flow control, and header translation information, and a processor containing logic for controlling the gateway packet handling operations, wherein packets received via said interfaces to the CL network are temporarily stored in said packet buffer, under the control of said processor using information stored in said database, until a path is set up for application of said packets to said interfaces to the CO network, wherein said gateway is arranged to generate and transmit to the source of the datagrams, a signal requesting the source to slow down or stop transmission of datagrams during the time period when the gateway is establishing a path through the CO network.

12. The invention described in claim 11 wherein said gateway further includes a switch fabric for CO networking, a CL packet forwarding engine and a protocol converter, wherein said gateway is arranged to convert packets from CO to CL format and vice-versa.

13. The invention defined in claim 11 wherein said gateway is arranged to generate and transmit to the source of the datagrams, a signal requesting the source to slow down or stop transmission of datagrams during the time period when the gateway is establishing a path through the CO network.

14. The invention defined in claim 11 wherein application or transport layer signals generated in a source are intercepted by the gateway and used to trigger connection setup in the CO network before datagrams have been transmitted from the source, thereby assuring that when datagrams reach the gateway, there is no loss of information.

15. A CL-CO gateway for routing packets arriving from a connectionless (CL) network onto a connection oriented (CO) network, said gateway comprising interfaces to the CO network, interfaces to the CL network, a moderately sized packet buffer for temporarily storing packets waiting for CO network setup or turnaround;

a database for storing forwarding, flow control, and header translation information, and a processor containing logic for controlling the gateway packet handling operations, wherein packets received via said interfaces to the CL network are temporarily stored in said packet buffer, under the control of said processor using information stored in said database, until a path is set up for application of said packets to said interfaces to the CO network, wherein datagrams received at the gateway are turned around and continue to be routed temporarily through the CL network during the period when the CO network path is being set up.

16. The invention defined in claim 15 wherein said gateway further includes a switch fabric for CO networking, a CL packet forwarding engine, and a protocol converter, wherein said gateway is arranged to convert packets from CO to CL format and vice-versa.

17. The invention defined in claim 15 wherein application or transport layer signals generated in a source are intercepted by the gateway and used to trigger connection setup in the CO network before datagrams have been transmitted from the source, thereby assuring that when datagrams reach the gateway, there is no loss of information.

18. The invention defined in claim 1, 5, 9, 10, 11 or 15 wherein the CO network is an MPLS (MultiProtocol Label Switching) or RSVP (Resource reSerVation Protocol) based IP network, a WDM (Wavelength Division Multiplexed) network, an ATM (Asynchronous Transfer Mode) network, or an STM (Synchronous Time Multiplexing) network, such as the telephony network or a SONET network.

19. The invention defined in claim 1, 5, 9, 10, 11 or 15 wherein the CL network is an internet protocol (IP) network.

* * * * *